United States Patent
Kim et al.

(10) Patent No.: US 11,869,456 B2
(45) Date of Patent: *Jan. 9, 2024

(54) DISPLAY APPARATUS AND METHOD OF COMPENSATING GAMMA VALUE OF THE SAME

(71) Applicant: Samsung Display Co., Ltd., Yongin-Si (KR)

(72) Inventors: Jeonkyoo Kim, Seoul (KR); Chaehee Park, Suwon-si (KR); Deokhwa Woo, Suwon-si (KR); Myungwoo Lee, Cheonan-si (KR); Manseung Cho, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/094,430

(22) Filed: Jan. 9, 2023

(65) Prior Publication Data

US 2023/0162702 A1 May 25, 2023

Related U.S. Application Data

(63) Continuation of application No. 17/195,696, filed on Mar. 9, 2021, now Pat. No. 11,551,640.

(30) Foreign Application Priority Data

Apr. 29, 2020 (KR) .................. 10-2020-0052689

(51) Int. Cl.
*G09G 5/10* (2006.01)
*G09G 3/20* (2006.01)
(Continued)

(52) U.S. Cl.
CPC ............. *G09G 5/10* (2013.01); *G06V 40/172* (2022.01); *G09G 3/2003* (2013.01); *H04N 23/50* (2023.01); *G09G 2320/0673* (2013.01)

(58) Field of Classification Search
CPC .......... G09G 5/10; G09G 5/02; G09G 3/2003; G09G 2320/0673; G09G 2320/0276; G09G 2320/0233; G06V 40/172; H04N 5/2251
See application file for complete search history.

(56) References Cited

U.S. PATENT DOCUMENTS 9,159,261 B2   10/2015   Oh
10,810,937 B2  10/2020   Hwang et al.
(Continued)

FOREIGN PATENT DOCUMENTS

KR   10-0886099 B1     3/2009
KR   10-2019-0029833 A 3/2019
(Continued)

*Primary Examiner* — Antonio A Caschera
(74) *Attorney, Agent, or Firm* — Innovation Counsel LLP

(57) ABSTRACT

A display apparatus includes a display panel, a first coordinate calculator, a second coordinate calculator and a gamma setter. The display panel includes a first display area and a second display area. The first coordinate calculator is configured to calculate color coordinates of first image data of the first display area. The second coordinate calculator is configured to calculate color coordinates of second image data of the second display area. The gamma setter is configured to adjust luminance of the first image data, the color coordinates of the first image data, luminance of the second image data and the color coordinates of the second image data.

22 Claims, 11 Drawing Sheets

(51) Int. Cl.
*G06V 40/16* (2022.01)
*H04N 23/50* (2023.01)

(56) References Cited

U.S. PATENT DOCUMENTS

| | | |
|---|---|---|
| 10,839,729 B2 | 11/2020 | Yoo et al. |
| 10,861,416 B2 | 12/2020 | Kim et al. |
| 11,037,523 B2 | 6/2021 | Hei et al. |
| 2009/0010538 A1 | 1/2009 | Kim |
| 2017/0061927 A1 | 3/2017 | Yoon et al. |
| 2020/0135147 A1 | 4/2020 | Tang et al. |

FOREIGN PATENT DOCUMENTS

| | | |
|---|---|---|
| KR | 10-2019-0055289 A | 5/2019 |
| KR | 10-2020-0001658 A | 1/2020 |
| KR | 10-2071631 B1 | 1/2020 |
| KR | 10-2078677 B1 | 2/2020 |

| GRAYSCALE | DB | DA |
|---|---|---|
| 4 | 0.045019 | 0.157477893 |
| 8 | 0.206852 | 0.629911572 |
| 16 | 0.95044 | 2.51964629 |
| 31 | 4.072458 | 9.458515955 |
| 63 | 19.38251 | 39.06435986 |
| 95 | 47.84679 | 88.82737409 |
| 127 | 90.62105 | 158.7475586 |
| 159 | 148.5712 | 248.8249135 |
| 191 | 222.3998 | 359.0594387 |
| 223 | 312.7027 | 489.4511342 |
| 255 | 420 | 640 |

| GRAYSCALE | DB | DA |
|---|---|---|
| 4 | 0.045019 | 0.055017854 |
| 8 | 0.206852 | 0.244184526 |
| 16 | 0.95044 | 1.083758782 |
| 31 | 4.072458 | 4.49264713 |
| 63 | 19.38251 | 20.63748869 |
| 95 | 47.84679 | 49.90917815 |
| 127 | 90.62105 | 93.164974 |
| 159 | 148.5712 | 151.0353076 |
| 191 | 222.3998 | 224.0249591 |
| 223 | 312.7027 | 312.5576426 |
| 255 | 420 | 417 |

DISPLAY APPARATUS AND METHOD OF COMPENSATING GAMMA VALUE OF THE SAME

PRIORITY STATEMENT

This application is a continuation of U.S. patent application Ser. No. 17/195,696, filed on Mar. 9, 2021, which claims priority to and the benefit of Korean Patent Application No. 10-2020-0052689, filed on Apr. 29, 2020 in the Korean Intellectual Property Office, the entire disclosures of which are incorporated by reference herein in its entirety.

BACKGROUND

1. Field

Example embodiments of the present inventive concept relate to a display apparatus and a method of compensating a gamma value of the display apparatus. More particularly, example embodiments of the present inventive concept relate to a display apparatus including an electronic module and a method of compensating the gamma value of the display apparatus.

2. Description of the Related Art

Generally, a display apparatus includes a display panel and a display panel driver. The display panel includes a plurality of gate lines, a plurality of data lines, a plurality of emission lines and a plurality of pixels. The display panel driver includes a gate driver, a data driver, an emission driver and a driving controller. The gate driver outputs gate signals to the gate lines. The data driver outputs data voltages to the data lines. The emission driver outputs emission signals to the emission lines. The driving controller controls the gate driver, the data driver and the emission driver.

The display apparatus may further include an electronic module to operate an additional function. When the electronic module is disposed under the display panel, a transmission area may be formed in the display panel for the operation of the electronic module so that the luminance difference and the color coordinate difference of the image on the display panel may be generated due to the transmission area.

SUMMARY

Example embodiments of the present inventive concept provide a display apparatus operating a gamma compensation for a first display area overlapping an electronic module and a second display area not overlapping the electronic module.

Example embodiments of the present inventive concept also provide a method of compensating a gamma value of the display apparatus.

In an example embodiment of a display apparatus according to the present inventive concept, the display apparatus includes a display panel, a first coordinate calculator, a second coordinate calculator and a gamma setter. The display panel includes a first display area and a second display area. The first coordinate calculator is configured to calculate color coordinates of first image data of the first display area. The second coordinate calculator is configured to calculate color coordinates of second image data of the second display area. The gamma setter is configured to adjust luminance of the first image data, the color coordinates of the first image data, luminance of the second image data and the color coordinates of the second image data.

In an example embodiment, the display apparatus may further include a compensation verifier configured to determine that the luminance of the first image data and the color coordinates of the first image data compensated by the gamma setter are in a target luminance range and in a target color coordinate range and the luminance of the second image data and the color coordinates of the second image data compensated by the gamma setter are in the target luminance range and in the target color coordinate range.

In an example embodiment, the display apparatus may further include an image receiver configured to receive the first image data and the second image data and an image storage configured to store the first image data and the second image data received from the image receiver and to transmit the first image data to the first coordinate calculator and the second image data to the second coordinate calculator.

In an example embodiment, the display apparatus may further include an image processor configured to receive the first image data and the second image data from the image storage and to convert the first image data and the second image data to a form appropriate for being displayed on the display panel.

In an example embodiment, the display apparatus may further include a first curve calculator configured to receive the color coordinates of the first image data from the first coordinate calculator and to calculate a gamma curve of the first image data and a second curve calculator configured to receive the color coordinates of the second image data from the second coordinate calculator and to calculate a gamma curve of the second image data.

In an example embodiment, the first display area may include a display portion and a transmitting portion. The second display area may not include the transmitting portion.

In an example embodiment, the display apparatus may further include an electronic module disposed under the display panel in an area corresponding to the first display area.

In an example embodiment, the electronic module may be a camera module.

In an example embodiment, the camera module may overlap the first display area in a plan view. The camera module may have a circular shape. The first display area may be disposed at a first end portion of the display panel. The first display area may have a rectangular shape. The second display area may be a portion of a display area of the display panel except for the first display area.

In an example embodiment, the camera module may overlap the first display area. The camera module may have a circular shape. The first display area may be disposed at a first end portion of the display panel. The first display area may have a circular shape. The second display area may be a portion of a display area of the display panel except for the first display area.

In an example embodiment, the electronic module may be a facial recognition sensor configured to recognize a user's face.

In an example embodiment of a display apparatus according to the present inventive concept, the display apparatus includes a display panel, a first gamma controller and a second gamma controller. The display panel includes a first display area and a second display area. The first gamma controller is configured to adjust luminance of first input image data of the first display area, color coordinates of the first input image data, luminance of second input image data of the second display area and color coordinates of the second input image data. The second gamma controller is serially connected to the first gamma controller. The second gamma controller is configured to adjust the luminance of first input image data and the color coordinates of the first input image data and configured not to adjust the luminance of second input image data and the color coordinates of the second input image data.

In an example embodiment, the display apparatus may further include an electronic module disposed under the display panel. The electronic module may be disposed in an area corresponding to the first display area. The electronic module may not be disposed in an area corresponding to the second display area.

In an example embodiment, the first gamma controller may be configured to receive a plurality of first compensation values corresponding to a plurality of grayscale values, configured to receive the first input image data and the second input image data and configured to apply the plurality of first compensation values to the first input image data and the second input image data according to the plurality of grayscale values of the first input image data and the second input image data.

In an example embodiment, the second gamma controller may be configured to receive a plurality of second compensation values corresponding to the plurality of grayscale values, configured to receive the first input image data to which the first compensation value is applied and configured to apply the plurality of second compensation values to the first input image data according to the plurality of grayscale values of the first input image data.

In an example embodiment of a method of compensating a gamma value of a display apparatus, the method includes calculating color coordinates of first image data of a first display area of a display panel, calculating color coordinates of second image data of a second display area of the display panel and adjusting luminance of the first image data, the color coordinates of the first image data, luminance of the second image data and the color coordinates of the second image data.

In an example embodiment, the method may further include determining that the adjusted luminance of the first image data and the adjusted color coordinates of the first image data are in a target luminance range and in a target color coordinate range and determining that the adjusted luminance of the second image data and the adjusted color coordinates of the second image data are in the target luminance range and in the target color coordinate range.

In an example embodiment, the method may further include receiving the first image data and the second image data and transmitting the received first image data to a first coordinate calculator and the received second image data to a second coordinate calculator.

In an example embodiment, the method may further include receiving the color coordinates of the first image data from the first coordinate calculator, generating a gamma curve of the first image data based on the color coordinates of the first image data, receiving the color coordinate of the second image data from the second coordinate calculator and generating a gamma curve of the second image data based on the color coordinates of the second image data.

According to the display apparatus and the method of compensating the gamma value of the display apparatus, the display apparatus includes the first coordinate calculator, the second coordinate calculator, the gamma setter and the compensation verifier operating the gamma compensation of the first image data for the first display area overlapping the electronic module and the second image data for the second display area not overlapping the electronic module. Thus, the display quality of the display panel may be enhanced.

BRIEF DESCRIPTION OF THE DRAWINGS

The above and other features and advantages of the present inventive concept will become more apparent by describing in detailed example embodiments thereof with reference to the accompanying drawings, in which.

DETAILED DESCRIPTION OF THE INVENTIVE CONCEPT

Hereinafter, the present inventive concept will be explained in detail with reference to the accompanying drawings.

Figure 1:
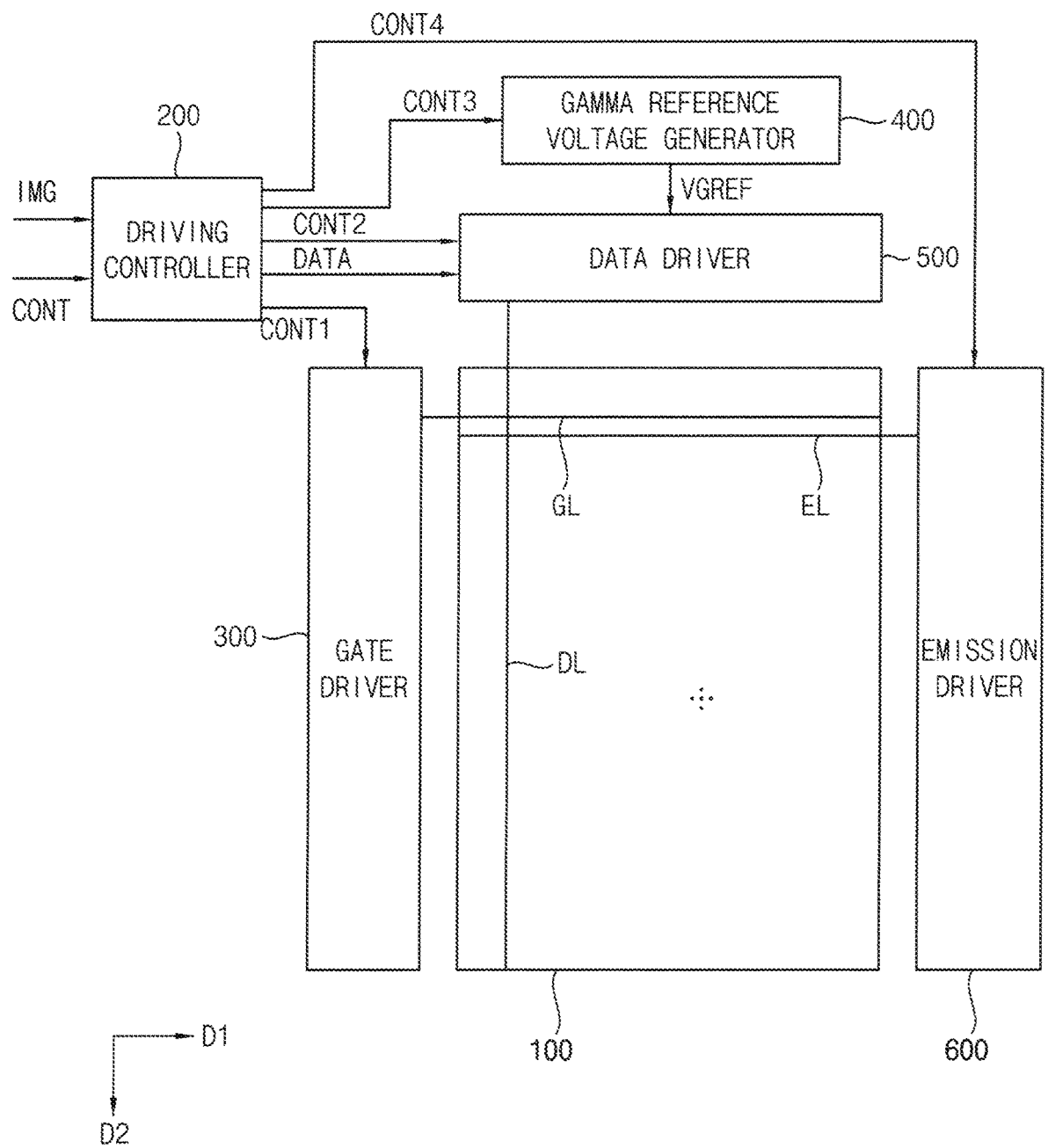
FIG. 1 is a block diagram illustrating a display apparatus according to an example embodiment of the present inventive concept.

FIG. 1 is a block diagram illustrating a display apparatus according to an example embodiment of the present inventive concept.

Referring to FIG. 1, the display apparatus includes a display panel 100 and a display panel driver. The display panel driver includes a driving controller 200, a gate driver 300, a gamma reference voltage generator 400, a data driver 500 and an emission driver 600.

The driving controller 200 and the data driver 500 may be integrally formed in one IC chip. The driving controller 200, the gamma reference voltage generator 400 and the data driver 500 may be integrally formed in one IC chip. The driving controller 200, the gate driver 300, the gamma reference voltage generator 400 and the data driver 500 may be integrally formed in one IC chip. The driving controller 200, the gate driver 300, the gamma reference voltage generator 400, the data driver 500 and the emission driver 600 may be integrally formed in one IC chip.

The display panel 100 includes a plurality of gate lines GL, a plurality of data lines DL, a plurality of emission lines EL and a plurality of pixels (not shown) electrically connected to the gate lines GL, the data lines DL and the emission lines EL. The gate lines GL extend in a first direction D1, the data lines DL extend in a second direction D2 crossing the first direction D1 and the emission lines EL extend in the first direction D1.

The driving controller 200 receives input image data IMG and an input control signal CONT from an external apparatus. For example, the input image data IMG may include red image data, green image data and blue image data. The input image data IMG may include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 generates the fourth control signal CONT4 for controlling an operation of the emission driver 600 based on the input control signal CONT, and outputs the fourth control signal CONT4 to the emission driver 600.

The gate driver 300 generates gate signals driving the gate lines GL in response to the first control signal CONT1 received from the driving controller 200. The gate driver 300 may output the gate signals to the gate lines GL. The gate driver 300 may be directly integrated on the display panel 100. The gate driver 300 may be mounted on the display panel 100 as an IC chip.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an example embodiment, the gamma reference voltage generator 400 may be embedded in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

The emission driver 600 generates emission signals to drive the emission lines EL in response to the fourth control signal CONT4 received from the driving controller 200. The emission driver 600 may output the emission signals to the emission lines EL. The emission driver 600 may be directly integrated on the display panel 100. The emission driver 600 may be mounted on the display panel 100 and an IC chip. Although the gate driver 300 is disposed in a first side of the pixels of the display panel 100 and applies the gate signal to the pixels and the emission driver 600 is disposed in a second side of the pixels of the display panel 100 and applies the emission signal to the pixels for convenience of explanation, the present inventive concept may not be limited thereto. Alternatively, the gate driver 300 and the emission driver 600 may be disposed in the first side of the pixels of the display panel 100 and apply the gate signal and the emission signal to the pixels. Alternatively, the gate drivers 300 and the emission drivers 600 may be disposed in both sides of the pixels of the display panel 100 and apply the gate signal and the emission signal to the pixels.

Figure 2:
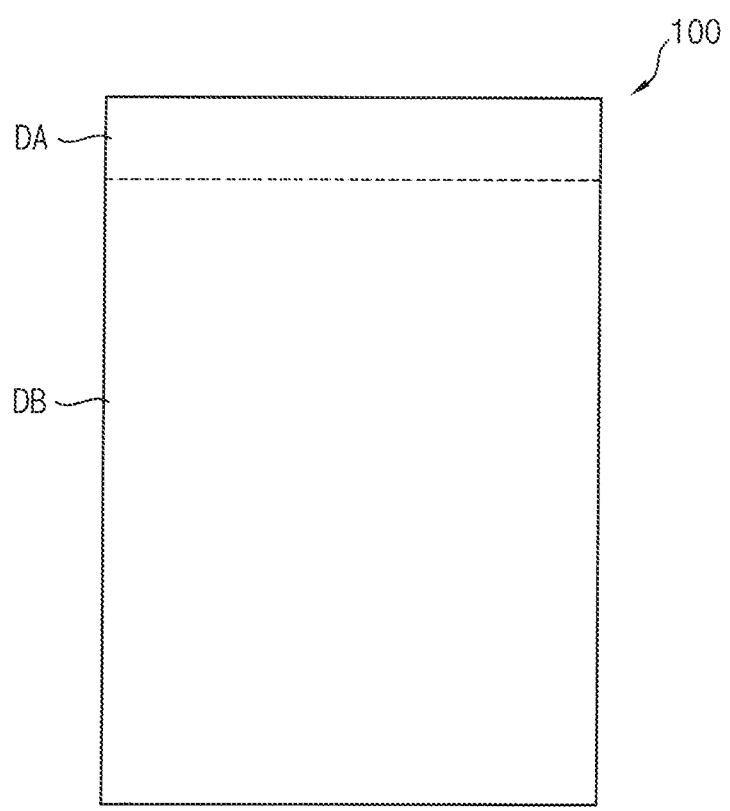
FIG. 2 is a conceptual diagram illustrating a display panel of FIG. 1.
Figure 3A:
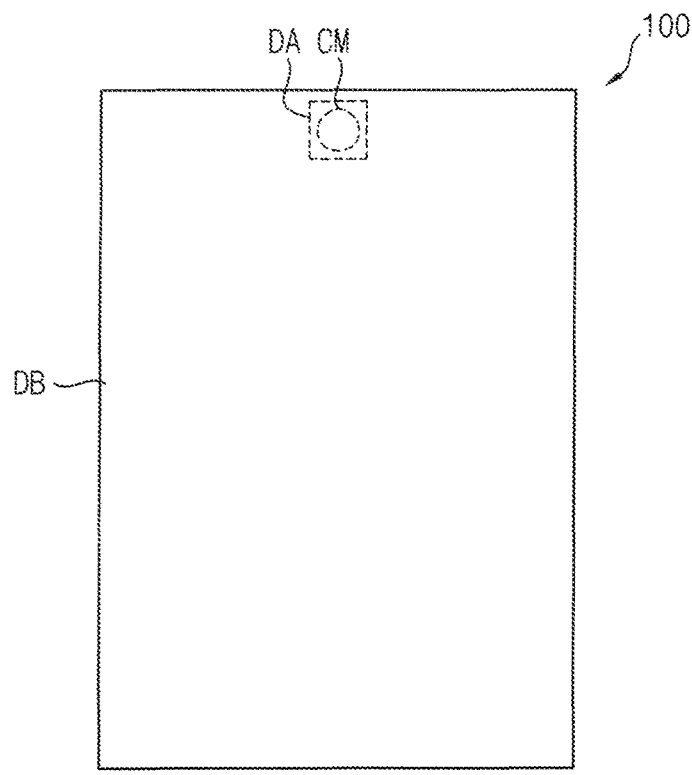
FIG. 3A is a conceptual diagram illustrating an electronic module disposed under the display panel of FIG. 1.
Figure 3B:
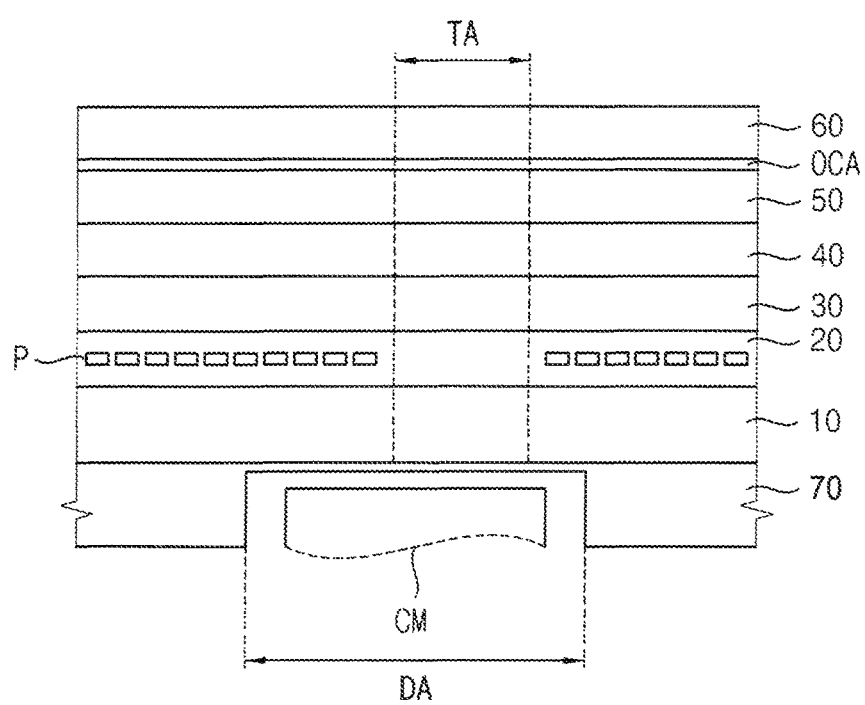
FIG. 3B is a cross-sectional view illustrating the display panel of FIG. 1 and the electronic module of FIG. 3A.
Figure 3C:
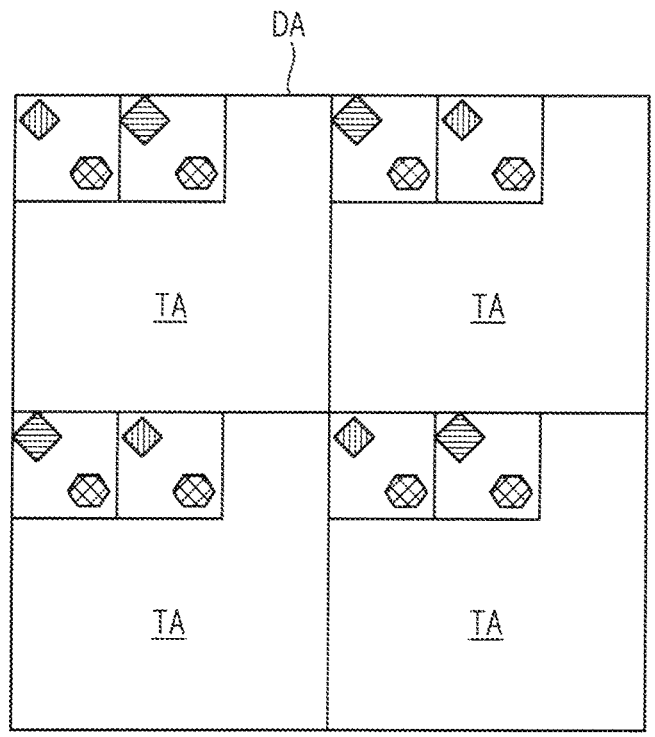
FIG. 3C is a conceptual diagram illustrating a pixel structure of a first display area of FIG. 2.
Figure 3D:
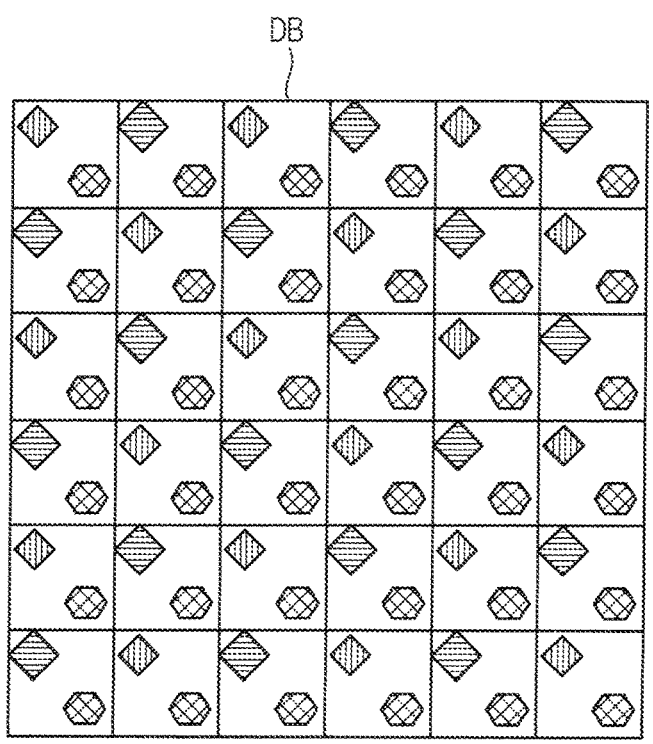
FIG. 3D is a conceptual diagram illustrating a pixel structure of a second display area of FIG. 2.

FIG. 2 is a conceptual diagram illustrating the display panel 100 of FIG. 1. FIG. 3A is a conceptual diagram illustrating an electronic module CM disposed under the display panel of FIG. 1. FIG. 3B is a cross-sectional view illustrating the display panel 100 of FIG. 1 and the electronic module CM of FIG. 3A. FIG. 3C is a conceptual diagram illustrating a pixel structure of a first display area DA of FIG. 2. FIG. 3D is a conceptual diagram illustrating a pixel structure of a second display area DB of FIG. 2.

Referring to FIGS. 1 to 3D, the display panel 100 may include the first display area DA and the second display area DB surrounding the first display area DA.

The display apparatus may further include the electronic module CM disposed under the display panel 100. In the present example embodiment, the electronic module CM may be a camera module. Alternatively, the electronic module CM may be a sensor module.

The electronic module CM may be an electronic element using light or sound. For example, the electronic element may be a sensor receiving and using light like an infrared sensor. For example, the electronic element may be a camera capturing images by receiving light. For example, the electronic element may be a sensor measuring a distance of an object or recognizing a fingerprint by outputting and detecting light and sound. For example, the electronic element may be a lamp outputting light. For example, the electronic element may be a speaker outputting sound. The electronic element using light may use light in various wavelength bands such as visible light, infrared light, and ultraviolet light.

For example, the electronic module CM may include a plurality of sensors sensing a user. For example, the electronic module CM may function as at least one of a proximity sensor determining the proximity of the user, a gesture sensor determining the user's gesture, a fingerprint sensor recognizing the user's fingerprint, an iris recognition sensor recognizing the user's iris and a facial recognition sensor recognizing the user's face.

In the present example embodiment, the electronic module CM may overlap a first end portion of the display panel 100. The electronic module CM may have a circular shape. The electronic module CM may overlap the first display area DA of the display panel 100. The electronic module CM may not overlap the second display area DB.

For example, the first display area DA may have a shape corresponding to an area in which the electronic module CM is disposed. For example, the first display area DA may have a rectangular shape, may be disposed at the first end portion of the display panel 100 and may overlap the area in which the electronic module CM is disposed. However, the shape of the first display area DA is not limited to the rectangular shape, but may have a circular shape and a polygonal shape including a rectangular shape, a hexagonal shape and so on.

The second display area DB may be a portion of the display area of the display panel 100 except for the first display area DA. For example, the first display area DA and the second display area DB do not overlap each other and the combined of the first display area DA and the second display area DB may cover all of the display area of the display panel 100.

For example, the first display area DA may be a display area overlapping the camera. For example, the first display area DA may be a display area overlapping the sensor. For example, the first display area DA may include a transmitting portion and a display portion and the second display area DB may not include the transmitting portion but may include only the display portion.

For example, a density of the pixel of the first display area DA may be different from a density of the pixel of the second display area DB. For example, a size of the pixel of the first display area DA may be different from a size of the pixel of the second display area DB. For example, an emitting area of the first display area DA may be different from an emitting area of the second display area DB. For example, the number of the pixels in a unit area of the first display area DA may be different from the number of the pixels in the unit area of the second display area DB. For example, a shape of the pixel of the first display area DA may be different from a shape of the pixel of the second display area DB.

As shown in FIG. 3B, the first display area DA of the display panel 100 may include the transmitting portion TA where the pixels P are not disposed. The first display area DA of the display panel 100 may include a substrate 10, a display layer 20 disposed on the substrate 10, an encapsulation layer 30 disposed on the display layer 20, an input sensing layer 40 disposed on the encapsulation layer 30, an optical function layer 50 disposed on the input sensing layer 40, an adhesive layer OCA disposed on the optical function layer 50 and a window 60 disposed on the adhesive layer OCA.

The display layer 20 includes the pixels P. The pixels P may not be disposed in the transmitting portion TA of the first display area DA.

A lower protecting film 70 may be disposed under the substrate 10. The lower protecting film 70 may have a recess in an area corresponding to the electronic module CM. Unlike FIG. 3B, the lower protecting film 70 may not have the recess in the area corresponding to the electronic module CM.

As shown in FIG. 3C, the first display area DA may include the display portion where then pixels are disposed and the transmitting portion TA where the pixels are not disposed. As shown in FIG. 3D, the second display area DB may include only the display portion where the pixels are disposed and not include the transmitting portion TA.

Figure 4:
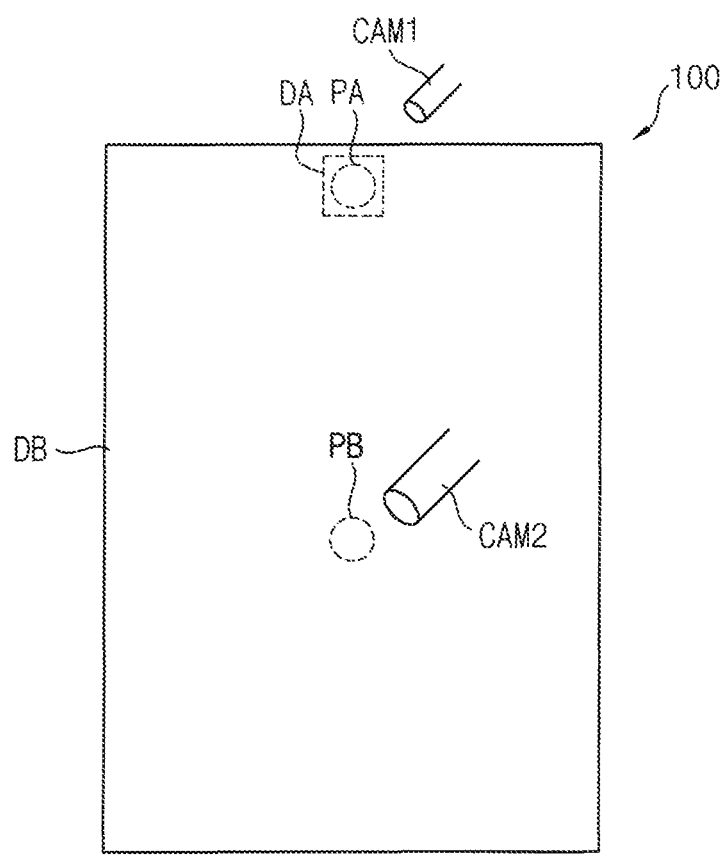
FIG. 4 is a conceptual diagram illustrating an operation of extracting first image data of the first display area of the display panel of FIG. 1 and second image data of the second display area of the display panel of FIG. 1.
Figure 5:
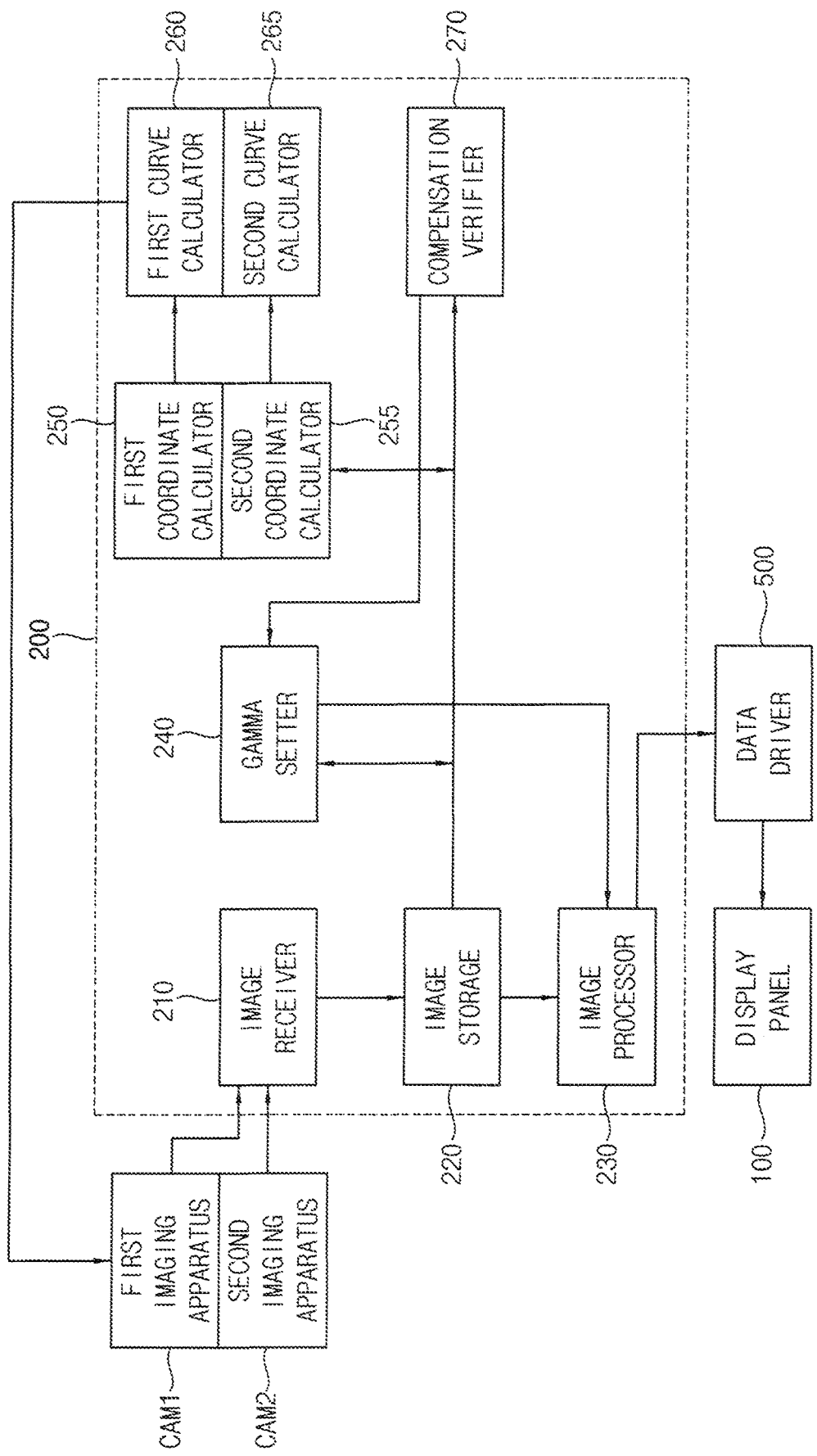
FIG. 5 is a block diagram illustrating a driving controller of FIG. 1.

FIG. 4 is a conceptual diagram illustrating an operation of extracting first image data of the first display area DA of the display panel 100 of FIG. 1 and second image data of the second display area DB of the display panel 100 of FIG. 1. FIG. 5 is a block diagram illustrating a driving controller 200 of FIG. 1.

Referring to FIGS. 1 to 5, a first image displayed at a central portion PA of the first display area DA of the display panel 100 may be captured by a first imaging apparatus CAM1 for gamma compensation (gamma correction) of the display apparatus. The captured data by the first imaging apparatus CAM1 may be referred to first image data.

A second image displayed at a central portion PB of the second display area DB of the display panel 100 may be captured by a second imaging apparatus CAM2 for the gamma compensation of the display apparatus. The captured data by the second imaging apparatus CAM2 may be referred to second image data.

The first display area DA may correspond to an area in which the electronic module CM is disposed. The first display area DA may further include an area surrounding the area in which the electronic module CM is disposed. The second display area DB may be a display area excluding the first display area DA among a display area. The pixel structure of the first display area DA may be different from the pixel structure of the second display area DB. For example, a size of a switching element in the pixel of the first display area DA may be different from a size of a switching element in the pixel of the second display area DB. For example, a current-voltage curve of the switching element in the pixel of the first display area DA may be different from a current-voltage curve of the switching element in the pixel of the second display area DB. For example, luminance per a unit area of the first display area DA may be different from luminance per the unit area of the second display area DB.

Generally, when the display apparatus does not include the electronic module, only the central portion (e.g. PB) of the display panel 100 may be captured to perform the gamma compensation. However, when the display apparatus includes the electronic module, the pixel structure of the first display area DA and the pixel structure of the second display area DB are different from each other. Thus, when only the central portion (e.g. PB) of the display panel 100 is captured to perform the gamma compensation for the display apparatus including the electronic module, the gamma compensation may not be properly performed for the first display area DA.

Thus, in the present example embodiment, the gamma compensation may be performed using the first image data of the first display area DA and the second image data of the second display area DB. For example, a diameter of a lens of the first imaging apparatus CAM1 may be less than a diameter of a lens of the second imaging apparatus CAM2.

The driving controller 200 may perform the gamma compensation of the display apparatus. The driving controller 200 may include a gamma setter 240, a first coordinate calculator 250 and a second coordinate calculator 255.

The first coordinate calculator 250 may calculate color coordinates of the first image data of the first display area DA. The second coordinate calculator 255 may calculate color coordinates of the second image data of the second display area DB.

The gamma setter 240 may compensate the gamma value of the first image data by adjusting luminance of the first image data and the color coordinates of the first image data. For example, the gamma setter 240 may adjust the luminance of the first image data and the color coordinates of the first image data such that the luminance of the first image data and the color coordinates of the first image data to be close to a target luminance and a target color coordinate.

For example, the gamma setter 240 may adjust the luminance of the first image data and the color coordinates of the first image data by changing a grayscale value of the first image data.

The driving controller 200 may further include the compensation verifier 270 determining that the luminance of the first image data and the color coordinates of the first image data compensated by the gamma setter 240 are in a target luminance range and in a target color coordinate range and the luminance of the second image data and the color coordinates of the second image data compensated by the gamma setter 240 are in the target luminance range and in the target color coordinate range.

When the luminance of the first image data and the color coordinates of the first image data compensated by the gamma setter 240 exceeds the target luminance range and the target color coordinate range, the gamma setter 240 may adjust the luminance of the first image data and the color coordinates of the first image data until the luminance of the first image data and the color coordinates of the first image data to be close to a target luminance and a target color coordinate.

Similarly, when the luminance of the second image data and the color coordinates of the second image data compensated by the gamma setter 240 exceeds the target luminance range and the target color coordinate range, the gamma setter 240 may adjust the luminance of the second image data and the color coordinates of the second image data until the luminance of the second image data and the color coordinates of the second image data to be close to a target luminance and a target color coordinate.

For example, the target luminance may be 420 nit for the highest grayscale value. The target color coordinate may be (0.299, 0.315).

The driving controller 200 may further include an image receiver 210 receiving the first image data from the first imaging apparatus CAM1 and the second image data from the second imaging apparatus CAM2 and an image storage 220 storing the first image data and the second image data received from the image receiver 210 and transmitting the first image data to the first coordinate calculator 250 and the second image data to the second coordinate calculator 255.

The driving controller 200 may further include an image processor 230 receiving the first image data and the second image data from the image storage 220 and converting the first image data and the second image data to a form appropriate for being displayed on the display panel 100.

For example, the image processor 230 may receive the first image data and the second image data and may convert the first image data and the second image data into the data signal DATA. The image processor 230 may output the data signal DATA to the data driver 500.

The data driver 500 may convert the data signal DATA to the data voltage and may output the data voltage to the display panel 100.

When the gamma setter 240 adjusts the first image data and the second image data, the image processor 230 receives the adjusted first image data and the adjusted second image data and converting the adjusted first image data and the adjusted second image data to the form appropriate for being displayed on the display panel 100.

When the gamma setter 240 adjusts the first image data and the second image data, the adjusted first image data and the adjusted second image data are outputted to the display panel 100 through the image processor 230 so that a user may check the change of the image with eyes.

The driving controller 200 may further include a first curve calculator 260 receiving the color coordinates of the first image data from the first coordinate calculator 250 and generating a gamma curve of the first image data and a second curve calculator 265 receiving the color coordinates of the second image data from the second coordinate calculator 255 and generating a gamma curve of the second image data. The first and second curve calculators 260 and 265 may output the gamma curve of the first image data and the gamma curve of the second image data to the first and second image apparatuses CAM1 and CAM2.

Figure 6:
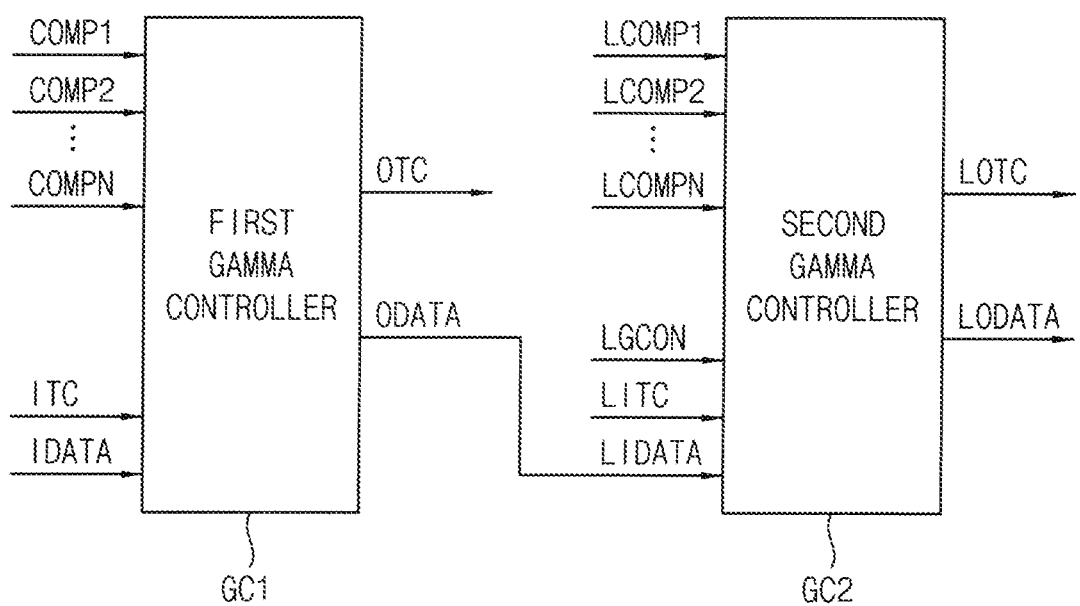
FIG. 6 is a block diagram illustrating a first gamma controller and a second gamma controller of a driving controller of a display apparatus according to an example embodiment of the present inventive concept.

FIG. 6 is a block diagram illustrating a first gamma controller GC1 and a second gamma controller GC2 of the driving controller 200 of a display apparatus according to an example embodiment of the present inventive concept.

Referring to FIGS. 1 to 4 and 6, the first gamma controller GC1 and the second gamma controller GC2 may be an example implementation of the driving controller 200.

When the input image data IMG is received, the first gamma controller GC1 and the second gamma controller GC2 may operate the gamma compensation to the input image data IMG using a determined compensation value and may transmit the compensated data to the data driver 500.

For example, the first gamma controller GC1 may compensate both first input image data corresponding to the first display area DA and second input image data corresponding to the second display area DB.

For example, the second gamma controller GC2 may compensate only the first input image data corresponding to the first display area DA and may not compensate the second input image data corresponding to the second display area DB.

The first gamma controller GC1 may adjust the luminance of the first input image data, the color coordinates of the first input image data, the luminance of the second input image data and the color coordinates of the second input image data. For example, the first gamma controller GC1 may adjust the luminance of the first input image data and the color coordinates of the first input image data by changing the grayscale value of the first input image data. For example, the first gamma controller GC1 may adjust the luminance of the second input image data and the color coordinates of the second input image data by changing the grayscale value of the second input image data.

The first gamma controller GC1 may receive a plurality of first compensation values COMP1 to COMPN corresponding to a plurality of grayscale values, receive the first input image data and the second input image data as an input signal IDATA and apply the first compensation value COMP1 to COMPN to the first input image data and the second input image data according to the grayscale value of the first input image data and the second input image data to generate an output signal ODATA. The first gamma controller GC1 may output the output signal ODATA.

The first gamma controller GC1 may receive a first input control signal ITC. For example, the first input control signal ITC may include a first input vertical start signal, a first input horizontal start signal and a first input data enable signal.

The first gamma controller GC1 may output a first output control signal OTC. For example, the first output control signal OTC may include a first output vertical start signal, a first output horizontal start signal and a first output data enable signal. For example, the first gamma controller GC1 may output the first output control signal OTC to the second gamma controller GC2. In addition, the first gamma controller GC1 may also output the first output control signal OTC to the gate driver 300 and the data driver 500 in an embodiment.

The second gamma controller GC2 may be disposed at a next stage of the first gamma controller GC1. The second gamma controller GC2 may receive the output signal ODATA of the first gamma controller GC1 as an input signal (LIDATA). The second gamma controller GC2 may adjust the luminance of the first input image data to which the first compensation value COMP1 to COMPN is applied (hereinafter referred as 'the compensated first input image data') and the color coordinates of the compensated first input image data and may not adjust the luminance of the second input image data to which the first compensation value COMP1 to COMPN is applied (hereinafter referred as 'the compensated second input image data') and the color coordinates of the compensated second input image data.

The second gamma controller GC2 may receive a plurality of second compensation values LCOMP1 to LCOMPN corresponding to a plurality of grayscale values, receive the compensated first input image data (ODATA) as the input signal LIDATA and apply the second compensation value LCOMP1 to LCOMPN to the compensated first input image data according to the grayscale value of the compensated first input image data to generate an output signal LODATA. The second gamma controller GC2 may output the output signal LODATA. The second gamma controller GC2 may output the output signal LODATA to the data driver 500.

The second gamma controller GC2 does not adjust the luminance of the second input image data and the color coordinates of the second input image data. When the second input image data are received as the input signal LIDATA, the second gamma controller GC2 may output the input signal LIDATA as it is as the output signal LODATA. The second gamma controller GC2 may output the output signal LODATA to the data driver 500.

The second gamma controller GC2 may receive a second input control signal LITC. For example, the second input control signal LITC may include a second input vertical start signal, a second input horizontal start signal and a second input data enable signal. For example, the second input control signal LITC of the second gamma controller GC2 may be the first output control signal OTC of the first gamma controller GC1.

The second gamma controller GC2 may receive an enable signal LGCON of the compensation operation of the second gamma controller GC2. When the second gamma controller GC2 receives the compensated first input image data, the enable signal LGCON may have an active level. When the second gamma controller GC2 receives the compensated second input image data, the enable signal LGCON may have an inactive level.

The second gamma controller GC2 may output a second output control signal LOTC. For example, the second output control signal LOTC may include a second output vertical start signal, a second output horizontal start signal and a second output data enable signal. The second gamma controller GC2 may output the second output control signal LOTC to the gate driver 300 and the data driver 500.

Figures 7, 8:
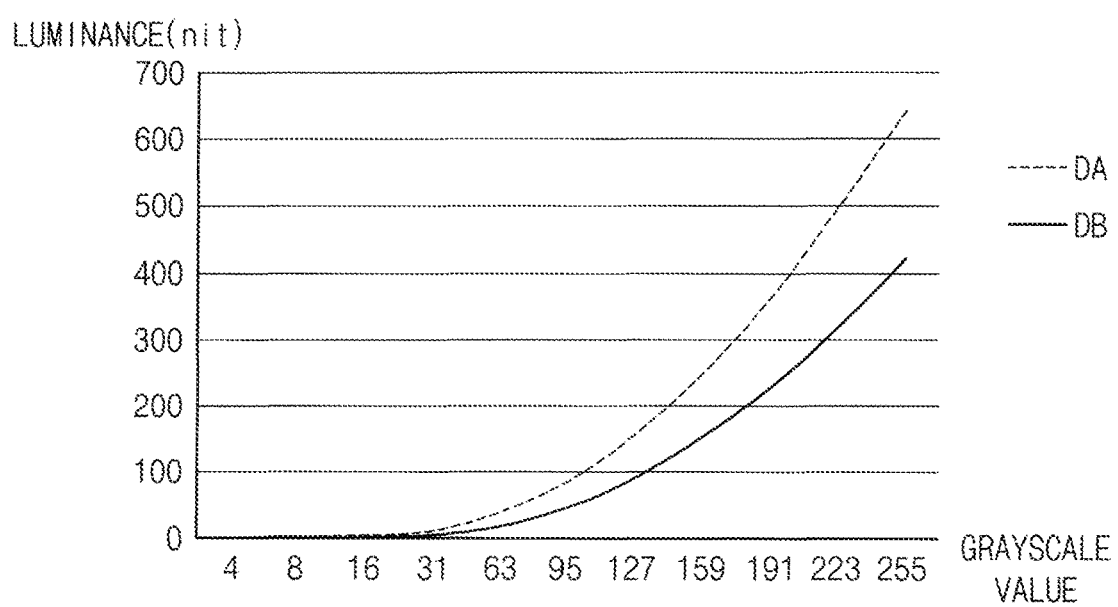
FIG. 7 is a table illustrating luminances for grayscale values after gamma compensation according to a comparative embodiment.
FIG. 8 is a graph illustrating luminances for grayscale values after gamma compensation according to a comparative embodiment.

FIG. 7 is a table illustrating luminances for grayscale values after gamma compensation according to a comparative embodiment. FIG. 8 is a graph illustrating luminances for grayscale values after gamma compensation according to the comparative embodiment.

For example, in the comparative embodiment in FIGS. 7 and 8, the driving controller 200 of FIG. 1 may perform the gamma compensation based only the second display area DB without considering the first display area DA.

In FIGS. 7 and 8, the luminance of the second display area DB not corresponding to the electronic module is 0.045019 nit for the grayscale value of 4, 0.206852 nit for the grayscale value of 8, 90.62105 nit for the grayscale value of 127 and 420 nit for the grayscale value of 255. Herein, the luminance of the second display area DB and the color coordinates of the second display area DB may be compensated to match the target luminance and the target color coordinate.

In FIGS. 7 and 8, the luminance of the first display area DA corresponding to the electronic module is 0.157477893 nit for the grayscale value of 4, 0.629911572 nit for the grayscale value of 8, 158.7475586 nit for the grayscale value of 127 and 640 nit for the grayscale value of 255. Herein, the luminance of the first display area DA and the color coordinates of the first display area DA may be greatly different from the target luminance and the target color coordinate.

In FIG. 8, the luminance curve of the first display area DA may be inconsistent with the luminance curve of the second display area DB.

Figures 9, 10A:
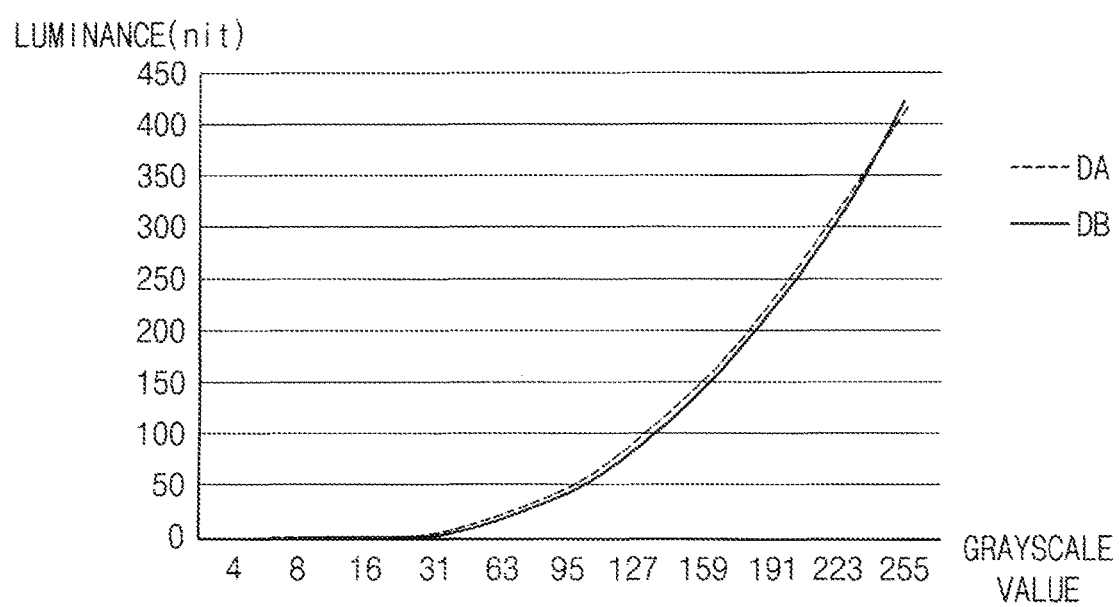
FIG. 9 is a table illustrating luminances for grayscale values after the gamma compensation of the driving controller of FIG. 1.
FIG. 10A is a graph illustrating luminances for grayscale values after the gamma compensation of the driving controller of FIG. 1.
Figure 10B:
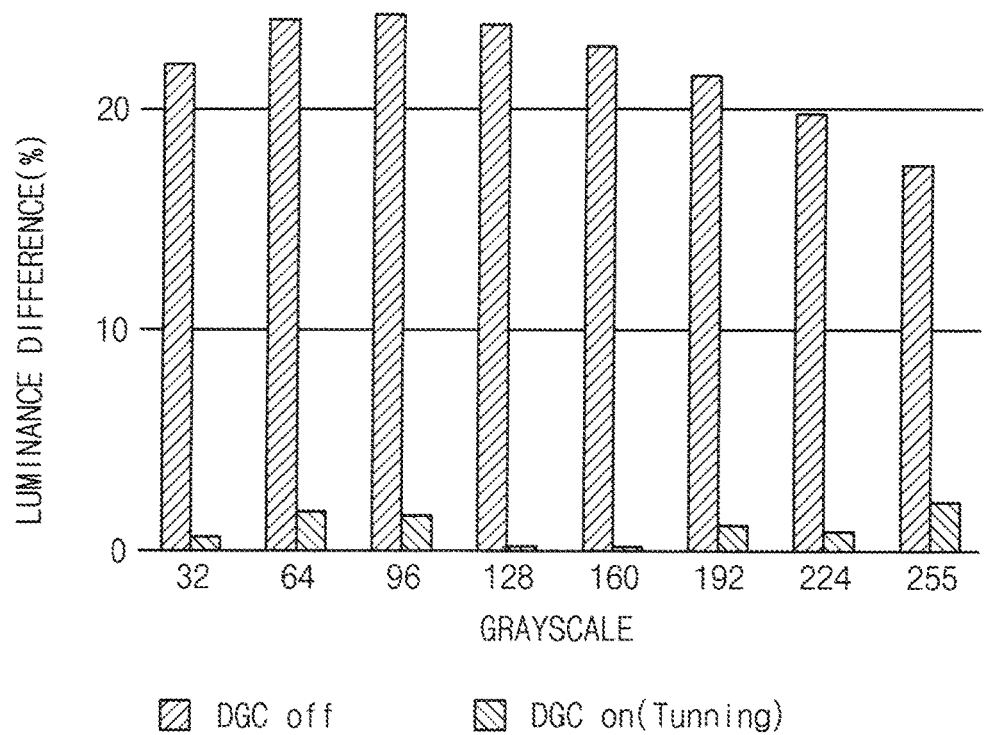
FIG. 10B is a graph illustrating luminance differences according to grayscale values after the gamma compensation according to the comparative embodiment and luminance differences according to grayscale values after the gamma compensation of the driving controller of FIG. 1.
Figure 10C:
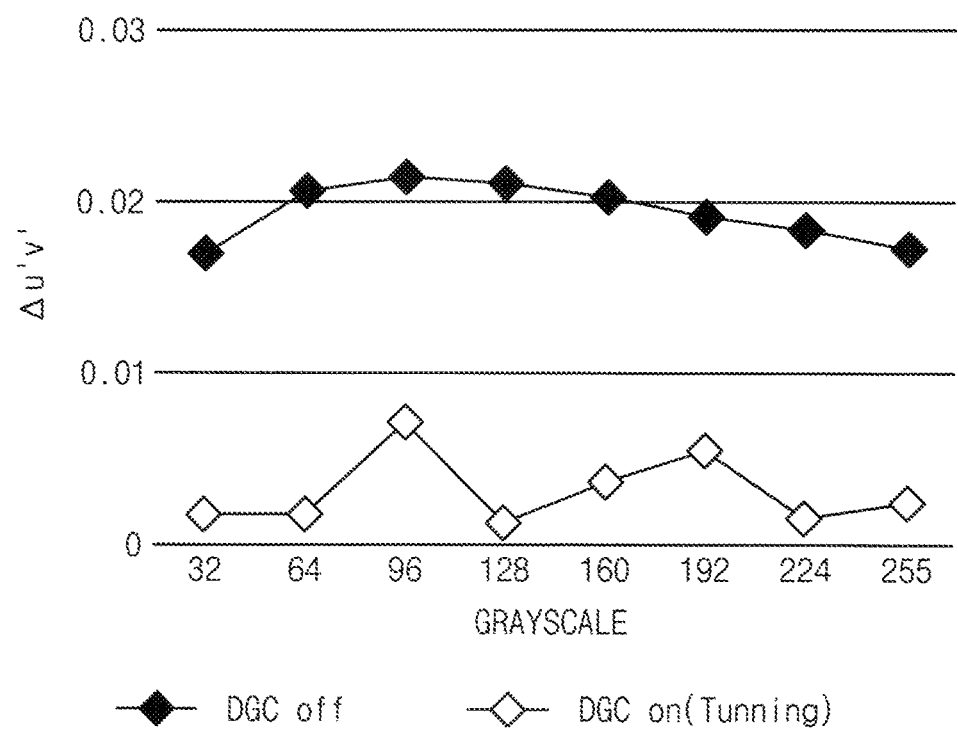
FIG. 10C is a graph illustrating color coordinate differences according to grayscale values after the gamma compensation according to the comparative embodiment and color coordinate differences according to grayscale values after the gamma compensation of the driving controller of FIG. 1.

FIG. 9 is a table illustrating luminances for grayscale values after the gamma compensation of the driving controller 200 of FIG. 1. FIG. 10A is a graph illustrating luminances for grayscale values after the gamma compensation of the driving controller 200 of FIG. 1. FIG. 10B is a graph illustrating luminance differences according to grayscale values after the gamma compensation according to the comparative embodiment and luminance differences according to grayscale values after the gamma compensation of the driving controller 200 of FIG. 1. FIG. 10C is a graph illustrating color coordinate differences according to grayscale values after the gamma compensation according to the comparative embodiment and color coordinate differences according to grayscale values after the gamma compensation of the driving controller 200 of FIG. 1.

For example, in the embodiment in FIGS. 9 and 10A, the driving controller 200 of FIG. 1 may perform the gamma compensation considering both the first display area DA and the second display area DB.

In FIGS. 9 and 10A, the luminance of the second display area DB is 0.045019 nit for the grayscale value of 4, 0.206852 nit for the grayscale value of 8, 90.62105 nit for the grayscale value of 127 and 420 nit for the grayscale value of 255. Herein, the luminance of the second display area DB and the color coordinates of the second display area DB may be compensated to match the target luminance and the target color coordinate.

In FIGS. 9 and 10A, the luminance of the first display area DA corresponding to the electronic module is 0.055017854 nit for the grayscale value of 4, 0.244184526 nit for the grayscale value of 8, 93.164974 nit for the grayscale value of 127 and 417 nit for the grayscale value of 255. Herein, the luminance of the first display area DA and the color coordinates of the first display area DA may be disposed in the target luminance range and the target color coordinate range.

In FIG. 10A, the luminance curve of the first display area DA may be substantially consistent with the luminance curve of the second display area DB.

In FIG. 10B, when the driving controller 200 performs the gamma compensation based only on the second display area DB without considering the first display area DA (DGC off), the luminance difference between the luminance of the first display area DA and the luminance of the second display area DB may be over 20% for the grayscale values between 32 to 192 and may be over 10% for the grayscale values of 224 and 255.

In contrast, when the driving controller 200 performs the gamma compensation considering both the first display area DA and the second display area DB (DGC on) according to the present example embodiment, the luminance difference between the luminance of the first display area DA and the luminance of the second display area DB may be under 10% for the grayscale values between 32 to 255.

In FIG. 10C, when the driving controller 200 performs the gamma compensation based only the second display area DB without considering the first display area DA (DGC off), the color coordinate difference Δu'v' between the color coordinates of the first display area DA and the color coordinates of the second display area DB may be about 0.02 for the grayscale values between 32 to 255.

In contrast, when the driving controller 200 operates the gamma compensation considering both the first display area DA and the second display area DB (DGC on) according to the present example embodiment, the color coordinate difference Δu'v' between the color coordinates of the first display area DA and the color coordinates of the second display area DB may be under 0.01 for the grayscale values between 32 to 255.

According to the present example embodiment, the display apparatus includes the first coordinate calculator 250, the second coordinate calculator 255, the gamma setter 240 and the compensation verifier 270 performing the gamma compensation (gamma correction) of the first image data for the first display area DA overlapping the electronic module CM and the second image data for the second display area DB not overlapping the electronic module CM. Thus, the display quality of the display panel 100 may be enhanced.

Figure 11:
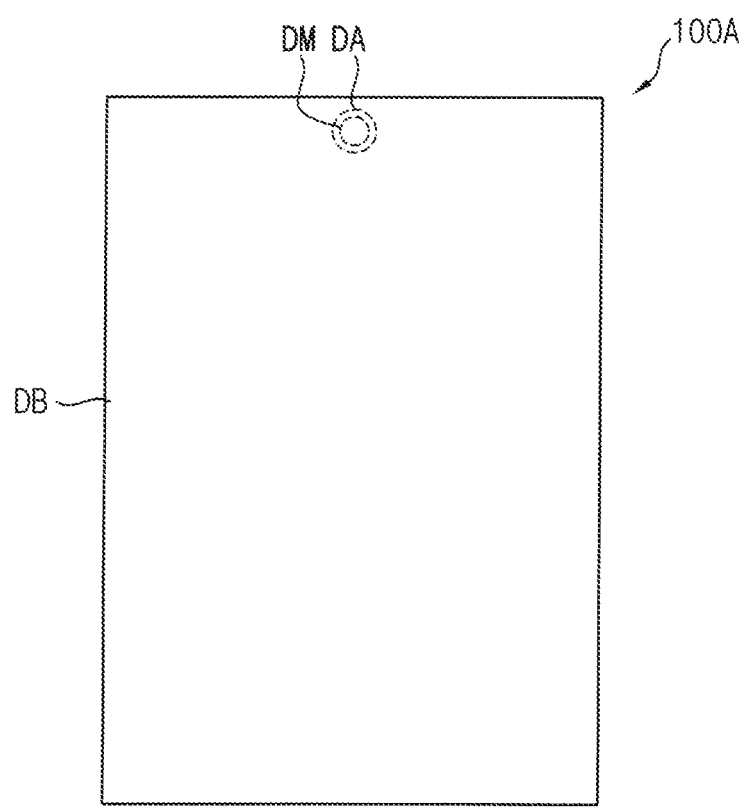
FIG. 11 is a conceptual diagram illustrating a display panel of a display apparatus according to an example embodiment of the present inventive concept.

FIG. 11 is a conceptual diagram illustrating a display panel 100A of a display apparatus according to an example embodiment of the present inventive concept.

The display apparatus and the method of compensating the gamma value of the display apparatus according to the present example embodiment is substantially the same as the display apparatus and the method of compensating the gamma value of the display apparatus of the previous example embodiment explained referring to FIGS. 1 to 10C except for the connection structure of the pixel in the first display area and the pixel in the second display area. Thus, the same reference numerals will be used to refer to the same or like parts as those described in the previous example embodiment of FIGS. 1 to 10C and any repetitive explanation concerning the above elements will be omitted.

Referring to FIGS. 1 and 3A to 11, the display apparatus includes a display panel 100A and a display panel driver. The display panel driver includes a driving controller 200, a gate driver 300, a gamma reference voltage generator 400, a data driver 500 and an emission driver 600.

The display panel 100A may include a first display area DA and a second display area DB.

The display apparatus may further include an electronic module CM disposed under the display panel 100A. In the present example embodiment, the electronic module CM may be a camera module CM. Alternatively, the electronic module CM may be a sensor module.

In the present example embodiment, the electronic module CM may overlap a first end portion of the display panel 100A. The electronic module CM and the first display area DA may have a circular shape. The electronic module CM may overlap the first display area DA of the display panel 100A. The electronic module CM may not overlap the second display area DB.

In the present example embodiment, the first display area DA may have a circular shape, may be disposed at the first end portion of the display panel 100A and may overlap the electronic module CM.

In the present example embodiment, the second display area DB may be a portion of the display area of the display panel 100A except for the first display area DA. For example, the first display area DA and the second display area DB do not overlap each other and the combined area of the first display area DA and the second display area DB may cover all of the display area of the display panel 100A.

The driving controller 200 may perform the gamma compensation of the display apparatus. The driving controller 200 may include a gamma setter 240, a first coordinate calculator 250 and a second coordinate calculator 255.

The first coordinate calculator 250 may calculate a color coordinates of the first image data of the first display area DA. The second coordinate calculator 255 may calculate a color coordinates of the second image data of the second display area DB.

The gamma setter 240 may compensate the gamma value of the first image data by adjusting luminance of the first image data and the color coordinates of the first image data. For example, the gamma setter 240 may adjust the luminance of the first image data and the color coordinates of the first image data such that the luminance of the first image data and the color coordinates of the first image data to be close to a target luminance and a target color coordinate.

For example, the gamma setter 240 may adjust the luminance of the first image data and the color coordinates of the first image data by changing a grayscale value of the first image data.

The driving controller 200 may further include the compensation verifier 270 determining that the luminance of the first image data and the color coordinates of the first image data compensated by the gamma setter 240 are in a target luminance range and in a target color coordinate range and the luminance of the second image data and the color coordinates of the second image data compensated by the gamma setter 240 are in the target luminance range and in the target color coordinate range.

According to the present example embodiment, the display apparatus includes the first coordinate calculator 250, the second coordinate calculator 255, the gamma setter 240 and the compensation verifier 270 operating the gamma compensation (gamma correction) of the first image data for the first display area DA overlapping the electronic module CM and the second image data for the second display area DB not overlapping the electronic module CM. Thus, the display quality of the display panel 100A may be enhanced.

According to the present inventive concept as explained above, the display quality of the display panel of the display apparatus including the electronic module may be enhanced.

The foregoing is illustrative of the present inventive concept and is not to be construed as limiting thereof. Although a few example embodiments of the present inventive concept have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific example embodiments disclosed, and that modifications to the disclosed example embodiments, as well as other example embodiments, are intended to be included within the scope of the appended claims. The present inventive concept is defined by the following claims, with equivalents of the claims to be included therein.

What is claimed is:

1. A display apparatus comprising:
   a display panel comprising a first display area and a second display area;
   a first coordinate calculator configured to calculate color coordinates of first image data of the first display area;
   a second coordinate calculator configured to calculate color coordinates of second image data of the second display area; and
   a gamma setter configured to adjust luminance of the first image data, the color coordinates of the first image data, luminance of the second image data and the color coordinates of the second image data,
   wherein the second display area surrounds the first display area, and
   wherein the first display area includes a pixel portion and a transmitting portion.

2. The display apparatus of claim 1, further comprising a compensation verifier configured to determine that the luminance of the first image data and the color coordinates of the first image data compensated by the gamma setter are in a target luminance range and in a target color coordinate range and the luminance of the second image data and the color coordinates of the second image data compensated by the gamma setter are in the target luminance range and in the target color coordinate range.

3. The display apparatus of claim 2, further comprising:
   an image receiver configured to receive the first image data and the second image data; and
   an image storage configured to store the first image data and the second image data received from the image receiver and to transmit the first image data to the first coordinate calculator and the second image data to the second coordinate calculator.

4. The display apparatus of claim 3, further comprising:
   an image processor configured to receive the first image data and the second image data from the image storage and to convert the first image data and the second image data to a form appropriate for being displayed on the display panel.

5. The display apparatus of claim 4, further comprising:
   a first curve calculator configured to receive the color coordinates of the first image data from the first coordinate calculator and to calculate a gamma curve of the first image data; and
   a second curve calculator configured to receive the color coordinates of the second image data from the second coordinate calculator and to calculate a gamma curve of the second image data.

6. The display apparatus of claim 1, wherein the second display area does not include the transmitting portion.

7. The display apparatus of claim 6, further comprising an electronic module disposed under the display panel in an area corresponding to the first display area.

8. The display apparatus of claim 7, wherein the electronic module is a camera module.

9. The display apparatus of claim 8, wherein the camera module overlaps the first display area in a plan view,
   wherein the camera module has a circular shape,
   wherein the first display area is disposed at a first end portion of the display panel,
   wherein the first display area has a rectangular shape, and
   wherein the second display area is a portion of a display area of the display panel except for the first display area.

10. The display apparatus of claim 8, wherein the camera module overlaps the first display area,
    wherein the camera module has a circular shape,
    wherein the first display area is disposed at a first end portion of the display panel,
    wherein the first display area has a circular shape, and
    wherein the second display area is a portion of a display area of the display panel except for the first display area.

11. The display apparatus of claim 7, wherein the electronic module is a facial recognition sensor configured to recognize a user's face.

12. The display apparatus of claim 1, wherein a pixel density of the first display area is different from a pixel density of the second display area.

13. A display apparatus comprising:
    a display panel comprising a first display area and a second display area;
    a first gamma controller configured to adjust luminance of first input image data of the first display area, color coordinates of the first input image data, luminance of second input image data of the second display area and color coordinates of the second input image data; and
    a second gamma controller serially connected to the first gamma controller and configured to adjust the luminance of first input image data and the color coordinates of the first input image data and configured not to adjust the luminance of second input image data and the color coordinates of the second input image data,
    wherein the second display area surrounds the first display area, and
    wherein the first display area includes a pixel portion and a transmitting portion.

14. The display apparatus of claim 13, further comprising an electronic module disposed under the display panel,
    wherein the electronic module is disposed in an area corresponding to the first display area, and
    wherein the electronic module is not disposed in an area corresponding to the second display area.

15. The display apparatus of claim 13, wherein the first gamma controller is configured to receive a plurality of first compensation values corresponding to a plurality of grayscale values, configured to receive the first input image data and the second input image data and configured to apply the plurality of first compensation values to the first input image data and the second input image data according to the plurality of grayscale values of the first input image data and the second input image data.

16. The display apparatus of claim 15, wherein the second gamma controller is configured to receive a plurality of second compensation values corresponding to the plurality of grayscale values, configured to receive the first input image data to which the first compensation value is applied and configured to apply the plurality of second compensation values to the first input image data according to the plurality of grayscale values of the first input image data.

17. The display apparatus of claim 13, wherein a pixel density of the first display area is different from a pixel density of the second display area.

18. A method of driving a display apparatus, the method comprising:
calculating color coordinates of first image data of a first display area of a display panel;
calculating color coordinates of second image data of a second display area of the display panel;
adjusting luminance of the first image data, the color coordinates of the first image data, luminance of the second image data and the color coordinates of the second image data; and
displaying the adjusted luminance of the first image data and the adjusted luminance of the second image data on the display panel,
wherein the first display area includes a pixel portion and a transmitting portion and the first display area is surrounded by the second display area.

19. The method of claim 18,
further comprising:
determining that the adjusted luminance of the first image data and the adjusted color coordinates of the first image data are in a target luminance range and in a target color coordinate range; and
determining that the adjusted luminance of the second image data and the adjusted color coordinates of the second image data are in the target luminance range and in the target color coordinate range.

20. The method of claim 19, further comprising:
receiving the first image data and the second image data; and
transmitting the received first image data to a first coordinate calculator and the received second image data to a second coordinate calculator.

21. The method of claim 20, further comprising:
receiving the color coordinates of the first image data from the first coordinate calculator;
generating a gamma curve of the first image data based on the color coordinates of the first image data;
receiving the color coordinate of the second image data from the second coordinate calculator; and
generating a gamma curve of the second image data based on the color coordinates of the second image data.

22. The method of claim 18, wherein a pixel density of the first display area is different from a pixel density of the second display area.

* * * * *